(12) United States Patent
Wei et al.

(10) Patent No.: US 11,747,664 B2
(45) Date of Patent: Sep. 5, 2023

(54) DISPLAY DEVICE

(71) Applicant: HISENSE VISUAL TECHNOLOGY CO., LTD., Qingdao (CN)

(72) Inventors: Changchun Wei, Qingdao (CN); Tuo Tang, Qingdao (CN); Lei Shi, Qingdao (CN); Zhiqiang Tang, Qingdao (CN); Jihang Ma, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/529,151

(22) Filed: Nov. 17, 2021

(65) Prior Publication Data

US 2022/0075220 A1 Mar. 10, 2022

Related U.S. Application Data

(63) Continuation of application No. PCT/CN2020/083940, filed on Apr. 9, 2020.

(30) Foreign Application Priority Data

Dec. 31, 2019 (CN) .......................... 201911424722.9

(51) Int. Cl.
*G02F 1/1333* (2006.01)
*G02F 1/13357* (2006.01)

(52) U.S. Cl.
CPC .... *G02F 1/13332* (2021.01); *G02F 1/133317* (2021.01); *G02F 1/133608* (2013.01)

(58) Field of Classification Search
CPC ........... G02F 1/13332; G02F 1/133317; G02F 1/133608; G02F 1/133322; G02F 2201/56; G02F 1/133308
See application file for complete search history.

(56) References Cited

U.S. PATENT DOCUMENTS

| | | | | |
|---|---|---|---|---|
| 9,766,488 B2 * | 9/2017 | Nishi | ................ | G02F 1/133308 |
| 2006/0055839 A1 * | 3/2006 | Hirao | ................ | G02F 1/133308 349/58 |
| 2008/0074877 A1 * | 3/2008 | Hsieh | ................ | G02F 1/133608 362/362 |

(Continued)

FOREIGN PATENT DOCUMENTS

| CN | 205016156 U | 2/2016 |
|---|---|---|
| CN | 205140403 U | 4/2016 |

(Continued)

OTHER PUBLICATIONS

International Search Report of PCT/CN2020/083940.

*Primary Examiner* — Tsion Tumebo
(74) *Attorney, Agent, or Firm* — J.C. PATENTS

(57) ABSTRACT

The present application provides a display device, including a panel, where a front surface of the panel is used to display an image, and a corner of the panel has a chamfer structure; a backlight module, providing a backlight source for the panel, where the backlight module includes: a middle frame including a side portion, and a side end of the panel is fixed to the side portion; a front housing, covering a bottom side of the panel; an switchover member, located at a position corresponding to the chamfer structure, where the switchover member connects an end of the side portion to an end of the front housing to form a television with a round corner.

16 Claims, 11 Drawing Sheets

(56) References Cited

U.S. PATENT DOCUMENTS

| | | | | |
|---|---|---|---|---|
| 2008/0079864 | A1* | 4/2008 | Nishimura | G02F 1/13452 349/58 |
| 2013/0286321 | A1* | 10/2013 | Kuo | G02F 1/133308 312/223.5 |
| 2015/0260908 | A1* | 9/2015 | Kiguchi | G02F 1/133308 362/606 |
| 2018/0120640 | A1* | 5/2018 | Nitanai | G02F 1/133608 |
| 2019/0243172 | A1* | 8/2019 | Gotou | G02F 1/1336 |

FOREIGN PATENT DOCUMENTS

| | | |
|---|---|---|
| CN | 205594259 U | 3/2018 |
| CN | 109239978 A | 1/2019 |
| CN | 208922013 U | 5/2019 |
| KR | 20180095750 A | 8/2018 |

\* cited by examiner

DISPLAY DEVICE

CROSS-REFERENCE TO RELATED APPLICATIONS

This application is a continuation of International Application No. PCT/CN2020/083940, filed on Apr. 9, 2020, which claims priority to Chinese Patent Application No. 201911424722.9, filed on Dec. 31, 2019, and entitled "DISPLAY DEVICE". These applications are hereby incorporated by reference in their entireties.

TECHNICAL FIELD

The present application relates to display technologies, and in particular, to a display device.

BACKGROUND

With the development of display technologies, display devices have gained great popularity and application, and as living standards are improving, people's requirements on the appearance of the display devices are becoming higher and higher.

Different solutions have been tried in the industry to pursue product diversity and appearance. However, these solutions are not desirable in certain aspects. There is a need to provide a relatively desirable display device.

SUMMARY

The present application provides a display device, including: a panel, where a front surface of the panel is used to display an image, and a corner of the panel has a chamfer structure; a backlight module, providing a backlight source for the panel, where the backlight module includes a middle frame including a side portion, and a side end of the panel is fixed to the side portion; a front housing, covering a bottom side of the panel; and an switchover member, located at a position corresponding to the chamfer structure, where the switchover member connects an end of the side portion to an end of the front housing.

The structure of the present application and its other inventive objectives and beneficial effects will be more clear and easy to understand through the description of embodiments in combination with the accompanying drawings.

Figure 1:
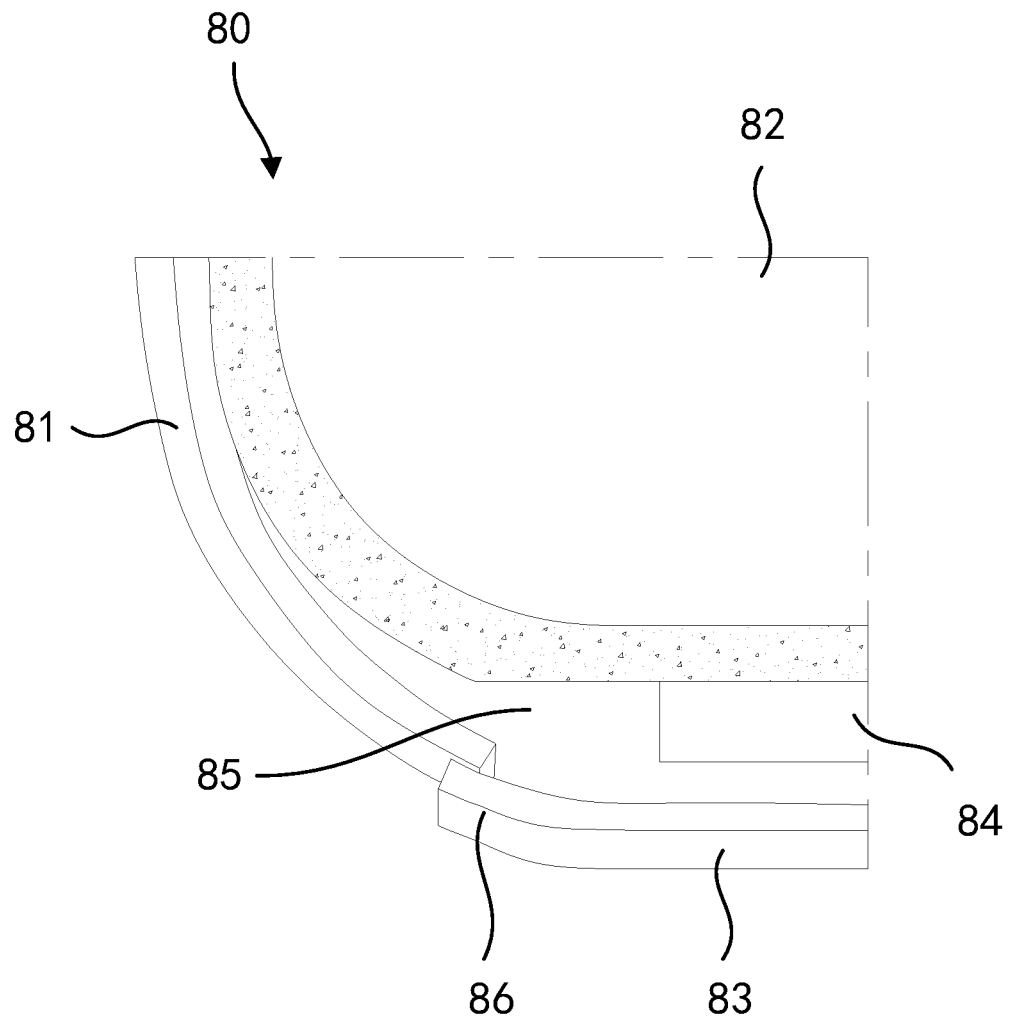
FIG. 1 is a schematic diagram of an internal structure of a display device in related art.

Description of reference signs is as follows:
80, 100—display device; 10, 82—panel; 11—Chip On Flex; 20—backlight module; 21—optical film; 22—diffusion plate; 23—reflection sheet; 24—light strip; 25—back plate; 26—plastic frame; 30, 81—middle frame; 31—side portion; 32—top portion; 50, 83—front housing; 60—switchover member; 61—support surface; 62—positioning surface; 63—support portion; 64—notch; 65—threaded hole; 70—corner of the display device; 84—first circuit board; 85—gradually widened gap; 86—step portion; 101—display area; 102—black matrix area; 311—end of the side portion; 312—first mounting section; 313—first mounting surface; 314—second mounting section; 315—second mounting surface; 316—boss; 317—second mounting portion; 500—main body; 501—end of the front housing; 502—hole; 503—internal threaded hole; 504—shielding portion; 505—extension portion; 506—insertion portion; 507—post; 508—guide post; 509—support member.

DESCRIPTION OF EMBODIMENTS

To make objectives, embodiments, and advantages of the present application clearer, the technical schemes in the embodiments of the present application will be described clearly and completely in conjunction with the drawings in the embodiments of the present application. Obviously, the described embodiments are some embodiments of the present application, but not all of the embodiments. Based on the embodiments in the present application, all other embodiments obtained by a person skilled in the art without creative work fall within the protection scope of the present application.

For example, corners of the display device are designed with chamfer edges, for example, a round structure, which allows for a lighter, more beautiful appearance. A current display device with chamfers includes a panel, a backlight module, and a front housing located below a bottom end of the panel. The backlight module includes a back plate, a plastic frame, and a middle frame located on sides and top of the panel. The back plate is located on a back side of the panel, the middle frame is used to fix and shield sides and top of the panel, and the front housing is used to shield the bottom of the panel and a circuit board connected with the bottom and corners of the panel, etc. For mounting of non-corner positions of the display device, the middle frame is fixed to the back plate, and the front housing is fixed to the back plate through the panel, the plastic frame, and the like.

For mounting of corner positions of the display device, an end of the middle frame can still be fixed to the back plate, however, the plastic frame cannot be arranged at the above-mentioned corner position due to that corners of the circuit board are connected to the panel and there is a gradually widened gap between corners of the panel and the plastic frame. Therefore, a portion of the front housing located in the corners and ends of the middle frame are overlapped and fixed together.

However, in the above solution, an end of the front housing overlapped with the end of the middle frame will cause insufficient connection at the corners of the display device. When the display device accidentally falls or goes through external impact, corners of the display device are easily damaged.

A display device with chamfered corners in the related art generally have problems, such as insufficient connection strength at the corners. Taking a display device with round corners will be described as an example. FIG. 1 is a schematic diagram of an internal structure of a display device in the related art. In FIG. 1, since structures of left and right corners of the display device 80 are similar, only a connection structure at the left corners of the display device 80 is shown, and a portion of a front housing 83 that shields a front side of a panel 82 is removed to facilitate observation of an internal structure of the display device 80.

Referring to the figure, the display device 80 in the related art includes a middle frame 81, a panel 82, a front housing 83 and a first circuit board 84, where a linear portion corresponding to the panel 82, left, top and right ends of the panel 82 are fixed to the middle frame 81, the middle frame 81 is fixed to a back plate, and a lower end of the panel 82 is fixed to the back plate by a plastic frame.

Corner structures of the panel 82 are also round edge structures. Since the lower part of the panel 82 is connected to the first circuit board 84, there is a space between a bottom portion of the front housing 83 and a bottom portion of the panel 82, and thus bending radius of the middle frame 81 must be gradually increased to make a smooth transition with the front housing 83. Therefore, there is a gradually widened gap 85 between an inner side wall of the middle frame 81 and the corner of the panel 82.

Correspondingly to a corner position of the panel 82, the end of the middle frame 81 can be fixed to the back plate. However, a corresponding position at an end of the front housing 83 cannot be provided with a plastic frame because the plastic frame will be located in the above-mentioned gradually widened gap 85 if the plastic frame is provided at this position, which makes a width of the gradually widened gap 85 more difficult to control. Therefore, it may consider making the end of the front housing 83 overlaps with the end of the middle frame 81, which will cause a more obvious step portion 86 at the boundary between the middle frame 81 and the front housing 83.

In the above scheme, there will be the following problems. First, overlapping of the end of the front housing 83 with the end of the middle frame 81 may cause insufficient connection at the corner of the display device 80. Secondly, since the above-mentioned gap 85 exists inside the middle frame 81, the corner of the panel 82 cannot be fixed to the middle frame 81, so that the corner of the panel 82 cannot be supported. Finally, overlapping of the end of the front housing 83 with the end of the middle frame 81 causes the presence of the step portion 86 at a junction of the front housing 83 and the middle frame 81 thereby affecting the external appearance of the display device 80.

The present application is proposed in view of the above problems.

Embodiments

Figure 2:
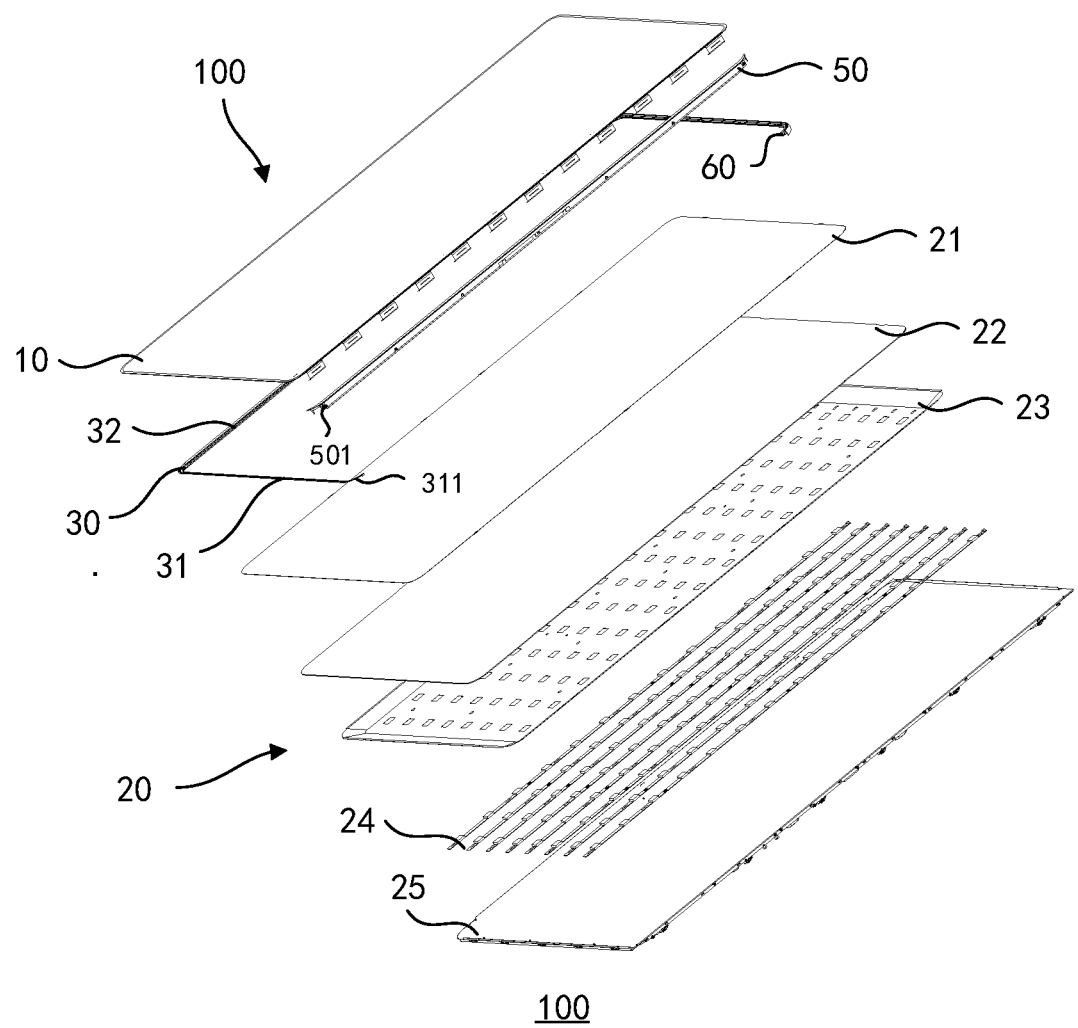
FIG. 2 is a schematic diagram of a split structure of a display device according to an embodiment of the present application.

FIG. 2 is an exploded diagram of a display device structure according to an embodiment of the present application. In the present application, a display device 100 may be a television, a display, a mobile phone, a tablet computer, or a notebook computer. The present application takes a liquid crystal display television as an example of display device, other types of display devices are similar and will omit here.

As shown in FIG. 2, the display device 100 includes: a panel 10, a backlight module 20, a front housing 50 and a switchover member 60; the backlight module 20 includes a middle frame 30.

The display device 100 further includes a back housing, and the backlight module 20 further includes an optical film 21, a diffusion plate 22, a reflection sheet 23, a light strip 24, and a back plate 25.

A front surface of the panel 10 is used to display an image, the backlight module 20 provides a backlight source for the panel 10, the middle frame 30 includes a side portion 31, and a side end of the panel 10 is fixed to the side portion 31; the front housing 50 covers a bottom side of the panel 10, and there is a space between a bottom end of the front housing 50 and a bottom end of the panel 10; at least a part of the switchover member 60 is located in the space, a corner of the display device 100 has a chamfer structure, and at a position corresponding to the chamfer structure, the switchover member 60 connects an end 311 of the side portion and an end 501 of the front housing.

The end 311 of the side portion is connected to the end 501 of front housing through the switchover member 60, in other words, the end of the front housing 50 is connected to the end of the middle frame 30 through the switchover member 60, and the end of the middle frame 30 is directly connected to the back plate 25, which enables the end of the front housing 50 to be indirectly fixed to the back plate 25, thus improving the connection strength at the corner position. Even if the display device 100 accidentally falls or goes through external impact, the corner of the display device 100 won't not easily damaged, which improves the reliability of the display device 100.

The structure and function of each part will be described in detail below.

Figure 3:
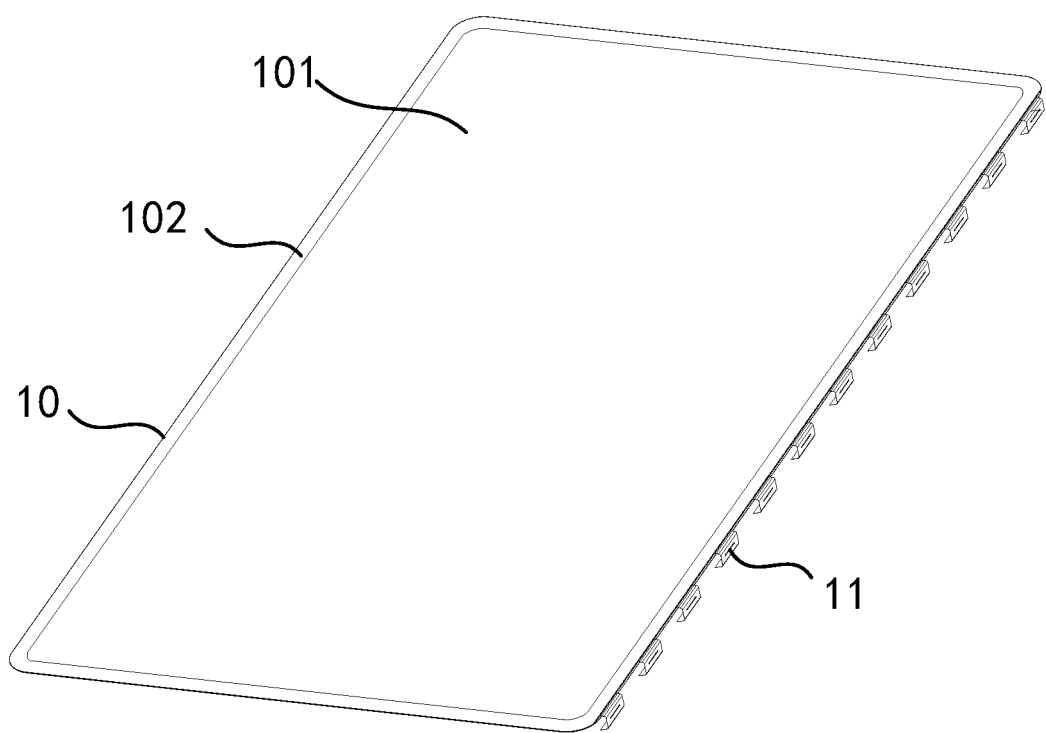
FIG. 3 is a schematic structural diagram of the panel in the display device according to the embodiment of the present application.

FIG. 3 is a schematic structural diagram of the panel in the display device according to the embodiment of the present application. Referring to FIG. 3, the front surface of the panel 10 is used to display an image. In the present application, the panel 10 may be, for example, a liquid crystal panel. Further, in the present application, corners of the display device have chamfer structures. In order to cooperate with the chamfer structures, the corners of the panel 10 also have chamfer structures.

As shown in FIG. 3, the front surface of the panel 10 includes a display area 101 for display and a black matrix area 102 surrounding the display area 101. The black matrix area 102 is used to arrange metal wires, etc. Generally, a width of the black matrix region 102 at the bottom end of the panel 10 is larger than that at the top and side ends thereof. In addition, a circuit board, such as a Chip On Flex 11 (COF) is also provided at the bottom end of the panel 10.

Referring to FIG. 2, the backlight module 20 provides the backlight source for the panel 10. According to positions of the light strip 24, the backlight module 20 can be divided into a direct-type backlight module and an edge-lit backlight module. In the present application, a direct-type backlight module is taken as an example of backlight module 20 for description.

The backlight module 20 includes the middle frame 30, and the middle frame 30 includes side portions 31, and the sides of the panel 10 is fixed to the side portions 31. In the example shown in FIG. 2, the middle frame 30 has left and right side portions 31, which can be used to fix left and right sides of the panel 10, respectively. Further, the middle frame 30 also has a top portion 32 which can be used to fix a top of the panel 10. It should be understood that the middle frame 30 in the present application is not only used to fix the panel 10 but also used to shield the top and sides of the panel 10.

The backlight module 20 further includes the optical film 21, the diffusion plate 22, the reflection sheet 23, the light strip 24 and the back plate 25 that are fixed in order. Light from the light strip 24 is sufficiently scattered after passing through the diffusion plate 22, and the reflection sheet 23 is used to make the light from the light strip 24 enter the diffusion plate as much as possible; the light scattered by the diffusion plate 22 passes through the optical film 21, which will convert a dot matrix light source into a surface light source with uniform brightness, and then irradiates to the panel 10.

Figure 4:
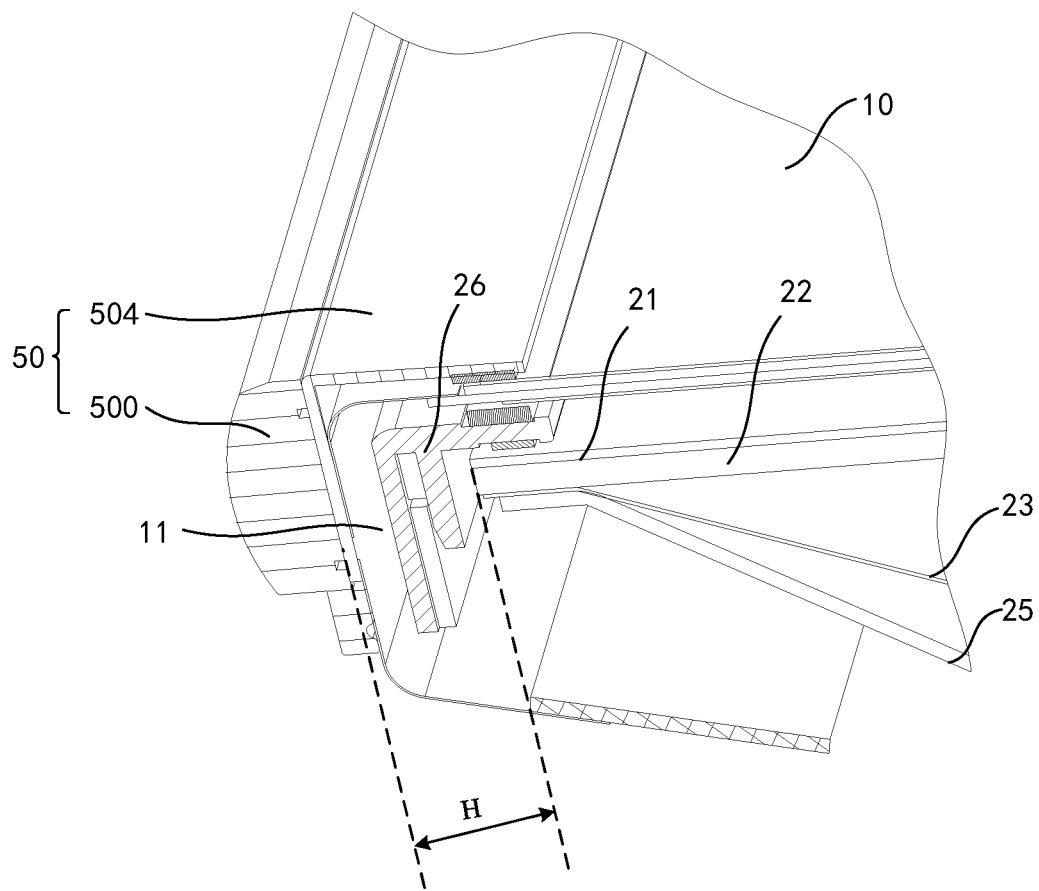
FIG. 4 is a longitudinal cross-sectional view of the display device according to the embodiment of the present application.

Further, FIG. 4 is a longitudinal cross-sectional view of the display device according to an embodiment of the present application. Referring to FIG. 4, the front housing 50 covering the bottom of the panel 10 specifically refers to that the front housing 50 shields the bottom of the panel 10, and there is a space H between the bottom of the front housing 50 and the bottom of the panel 10. The above-mentioned space H is used to receive the COF 11 at the bottom of the panel 10, and is used to accommodate other required structure members as well.

In FIG. 4, part of the front housing 50 is adhered to bottom edges of the panel 10, the bottom edges of the panel 10 are fixed to the plastic frame 26, and the plastic frame 26 is fixed to the back plate 25.

Figure 5:
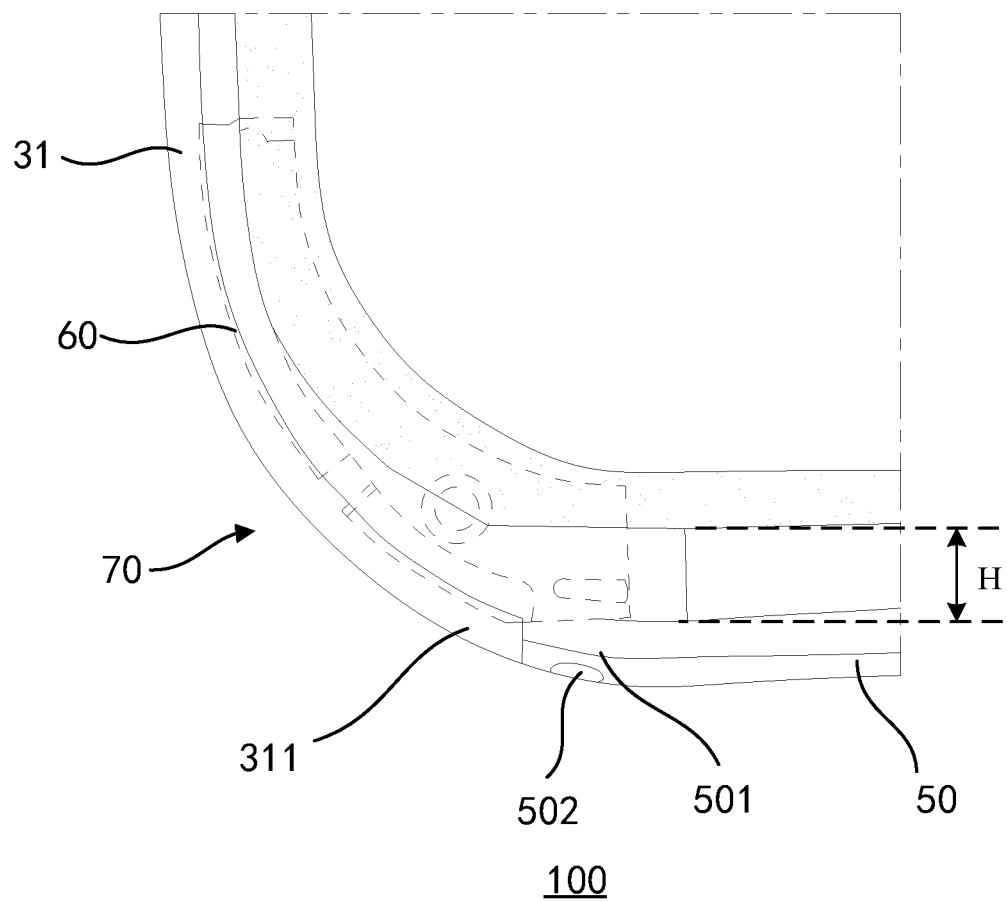
FIG. 5 is a schematic diagram of an internal structure of the display device according to the embodiment of the present application.

FIG. 5 is a schematic structural diagram of an internal structure of the display device according to an embodiment of the present application. Referring to FIG. 5, the switchover member 60 is indicated by a dotted line, at least a part of the switchover member 60 is located in the space H, and the corner 70 of the display device has a chamfer structure, and at a position corresponding to the chamfer structure, the switchover member 60 connects the end 311 of the side portion and the end 501 of the front housing. In addition, the chamfer structure may include round chamfer, square chamfer, or chamfer of any curve, etc. In the example shown in FIG. 5, the corner 70 of the display portion is a smooth chamfer whose radius gradually increases. In the present application, the chamfer of the corner 70 of the panel is, for example, a round chamfer.

In some embodiments, the ends of the front housing 50 and the side portions 31 corresponding to the corners of the display device 100 are both bent ends and match in shape, so that an outer contour of a junction between the side portion 31 and the front housing 50 is a continuous curve surface.

The structure shown in FIG. 5 is a structure in which end surfaces of the ends of the front housing 50 and the side portions 31 mate with each other, so that the corners of the display device 100 present a smoothly curved surface and the appearance of the display device 100 is desirable.

It should be understood that, in FIG. 5, the switchover member 60 is located in the space H at a position close to the corner 70 of the display device to facilitate the connection of end 311 of the side portion and the end 501 of the front housing, but the present application is not limited thereto, it can also be located at a position far away from the corner of the display device 100.

In the drawings of the embodiments of the present application, in order to facilitate the description of relative positions between the various components, directions are defined as follows. A direction from an edge of the panel 10 toward a middle portion of the panel 10 is an inward direction, and a direction from the middle portion of the panel 10 toward the edge of the panel 10 is an outward direction. In addition, a direction from the front surface of the panel 10 toward back surface of the panel 10 is a backward direction, and a direction from the back surface of the panel 10 toward the front surface of the panel 10 is a forward direction.

Figure 6:
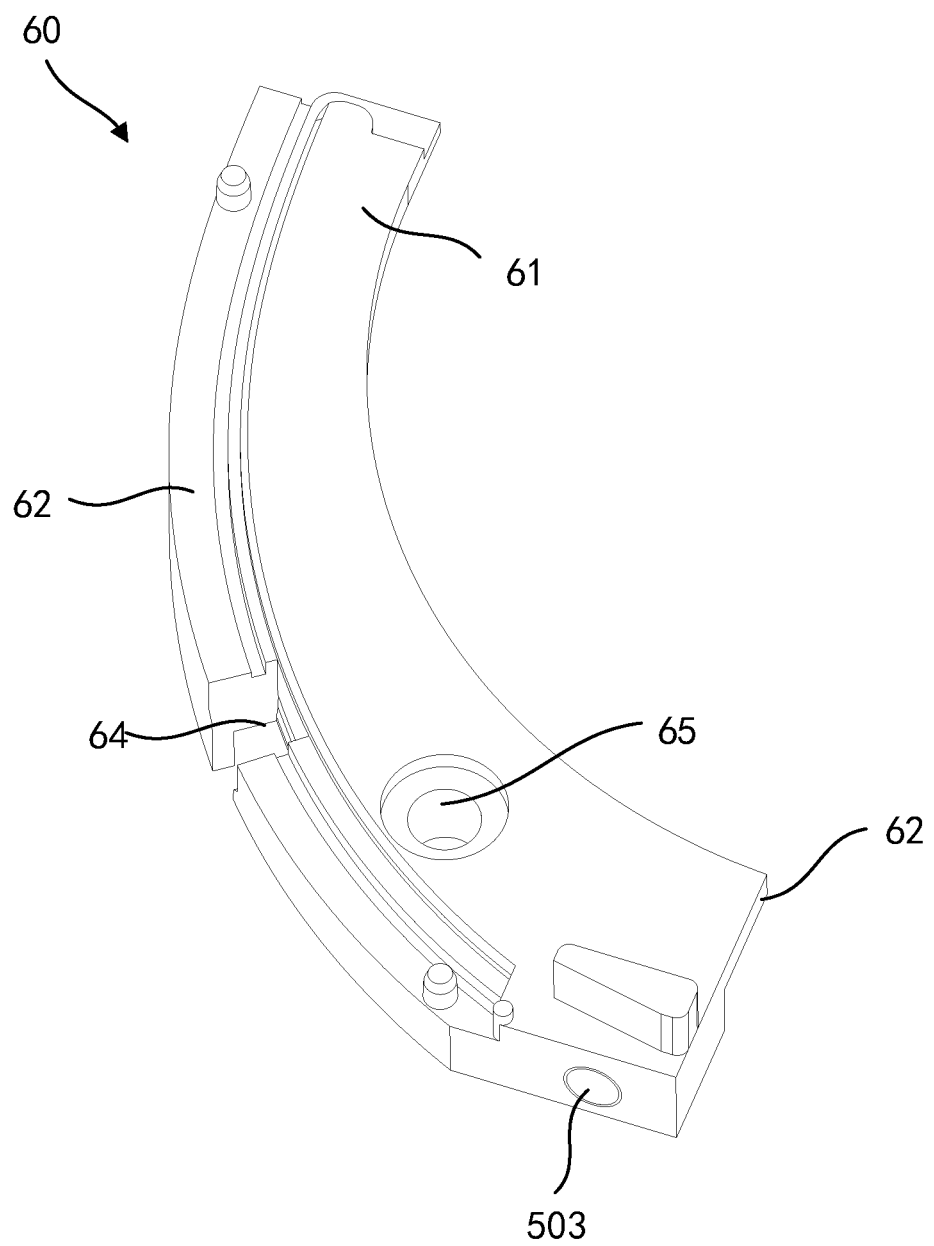
FIG. 6 is a schematic diagram of a three-dimensional structure of the switchover member in the display device according to the embodiment of the present application.

FIG. 6 is a schematic diagram of a three-dimensional structure of the switchover member in the display device according to an embodiment of the present application. Referring to FIGS. 5 and 6, the switchover member 60 includes a support surface 61 extending inward, and the corner of the panel 10 is fixed to the support surface 61.

When the corner of the display device 100 has a chamfer structure, the panel 10 is correspondingly provided with a chamfer structure at the corner. In this way, there will be a gradually widened gap between the corner of the display device 100 and the corner of the panel 10, in related art, a problem that the portion at the corner of the panel 10 cannot be supported may occur, and by providing the support surface 61 for the switchover member 60, the corner of the panel 10 is fixed to the support surface 61.

The support surface 61 may be formed in various ways. For example, the switchover member 60 may include a support portion 63 extending inward, and a front surface of the support portion may be the support surface 61. Alternatively, it may be that the switchover member 60 includes a plurality of support stands extending inward, the plurality of support stands are spaced apart from each other, the support surface 61 is formed by the front side surfaces of the plurality of support stands, etc. Such modifications are included within the scope of the present application.

Figure 7:
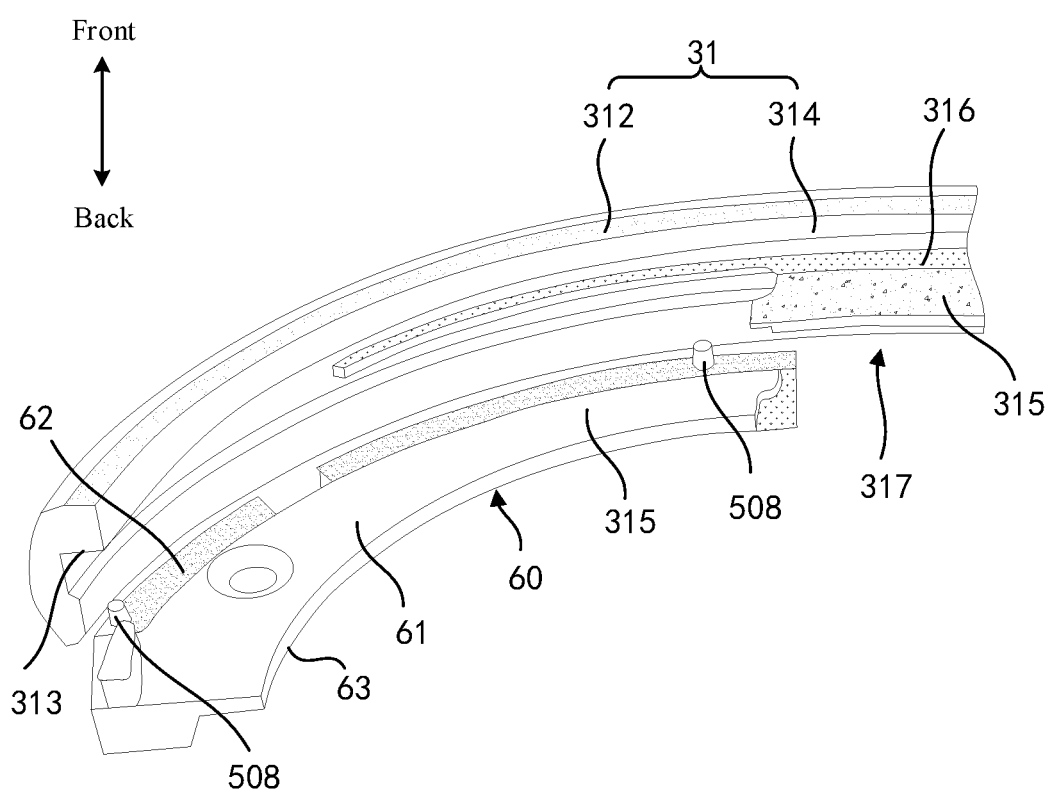
FIG. 7 is a schematic structural diagram of a cooperation between the middle frame and the switchover member in a display device according to the embodiment of the present application.

Next, mounting of the switchover member 60 and the middle frame 30 will be described. FIG. 7 is a schematic structural diagram of mounting between the middle frame and the switchover member in the display device according to an embodiment of the present application. Referring to FIGS. 6 and 7, the side portion 31 includes a first mounting section 312 corresponding to a corner of the panel 10, the first mounting section 312 includes a first mounting surface 313 disposed backward, and the switchover member 60 is provided with a positioning surface 62 facing forward corresponding to the first mounting surface 313, and the first mounting surface 313 and the positioning surface 62 are overlapped mounted. The first mounting section 312 corresponding to the corner of the panel 10 specifically refers to that the first mounting section 312 is disposed at a side of the corner of the panel 10.

As described above, overlapped mounting of the first mounting surface 313 disposed backward and the positioning surface 62 disposed forward is actually equivalent to cause the switchover member 60 to mate with the first mounting section 312 from a back side to avoid the switchover member 60 from protruding a front side surface of the middle frame 30, which affects the external appearance of the display device 100.

In addition, a plurality of, for example, two, guide posts 508 may be provided on the positioning surface 62, and guide holes are correspondingly provided on the first mounting surface 313 to mate with the guide posts 508 to ensure that a relative position of the first mounting surface and the switchover member 60 is relatively accurate.

Further, in order to ensure that the side portion 31 and the switchover member 60 can fix the panel 10 together, referring to FIGS. 6 and 7, the side portion 31 further includes a second mounting section 314 connected to the first mounting section 312, the second mounting section 314 includes a second mounting surface 315 extending inward, and at least a part of the side end of the panel is fixed to the second mounting surface 315.

As shown in FIGS. 6 and 7, the support surface 61 faces forward and is higher than the positioning surface 62 along the direction from front to back, so that the second mounting surface 315 and the support surface 61 are located in the same plane.

By making the support surface 61 higher than the positioning surface 62 along the direction from front to back, and the second mounting surface 315 and the support surface 61 are located in the same plane, a linear portion and a corner portion on the panel 10 can be fixed to the second mounting surface 315 and the support surface 61, thereby improving the stability and reliability of the switchover member 60 and the middle frame 30.

Figure 8:
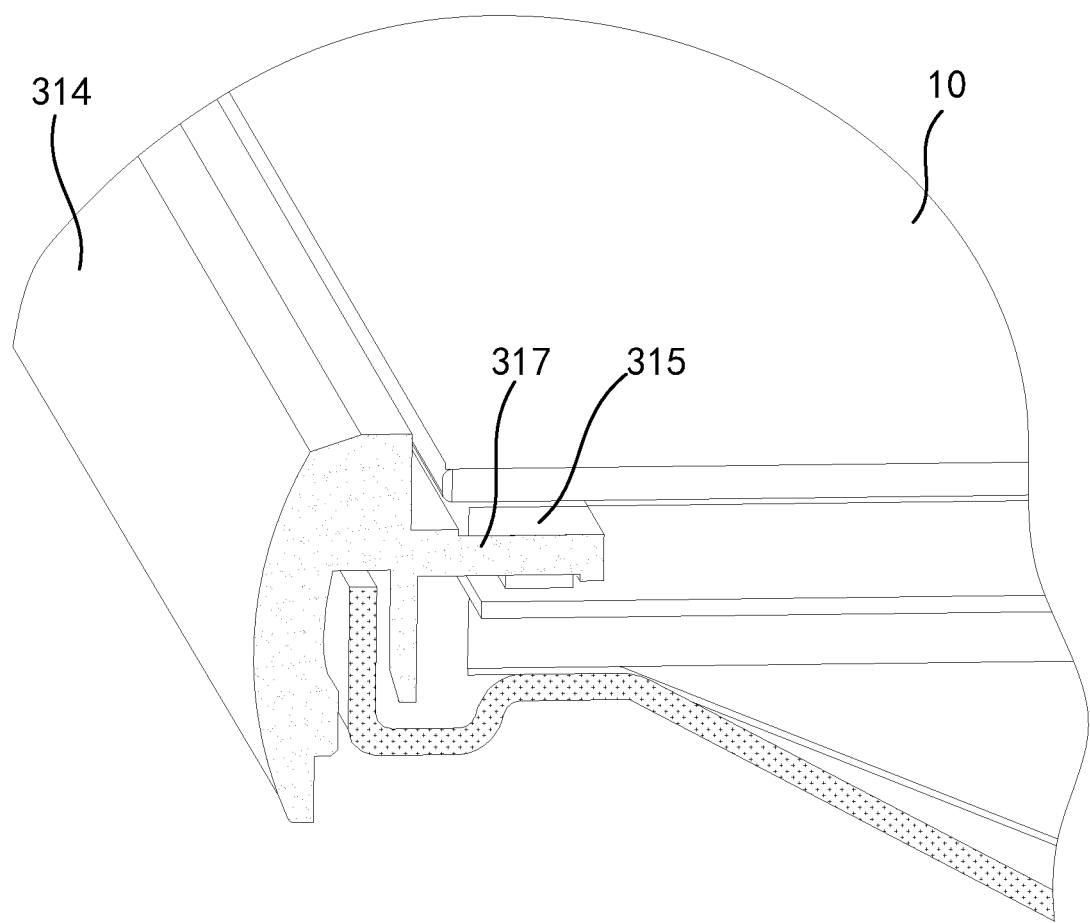
FIG. 8 is a schematic diagram of a three-dimensional structure of a cooperation between the second mounting section and the panel in a display device according to the embodiment of the present application.

The second mounting section 314 and the first mounting section 312 are two adjacent parts of the side portion 31. FIG. 8 is a schematic diagram of a three-dimensional connection structure between the second mounting section and the panel in the display device according to an embodiment of the present application. For how to make the second mounting surface 315, referring to FIG. 8, it may be that the second mounting section 314 includes a second mounting portion 317 extending inward, and a front side surface of the second mounting portion 317 is the second mounting surface 315. The panel 10 may be adhered to the second mounting surface 315 by adhesive.

Figure 9:
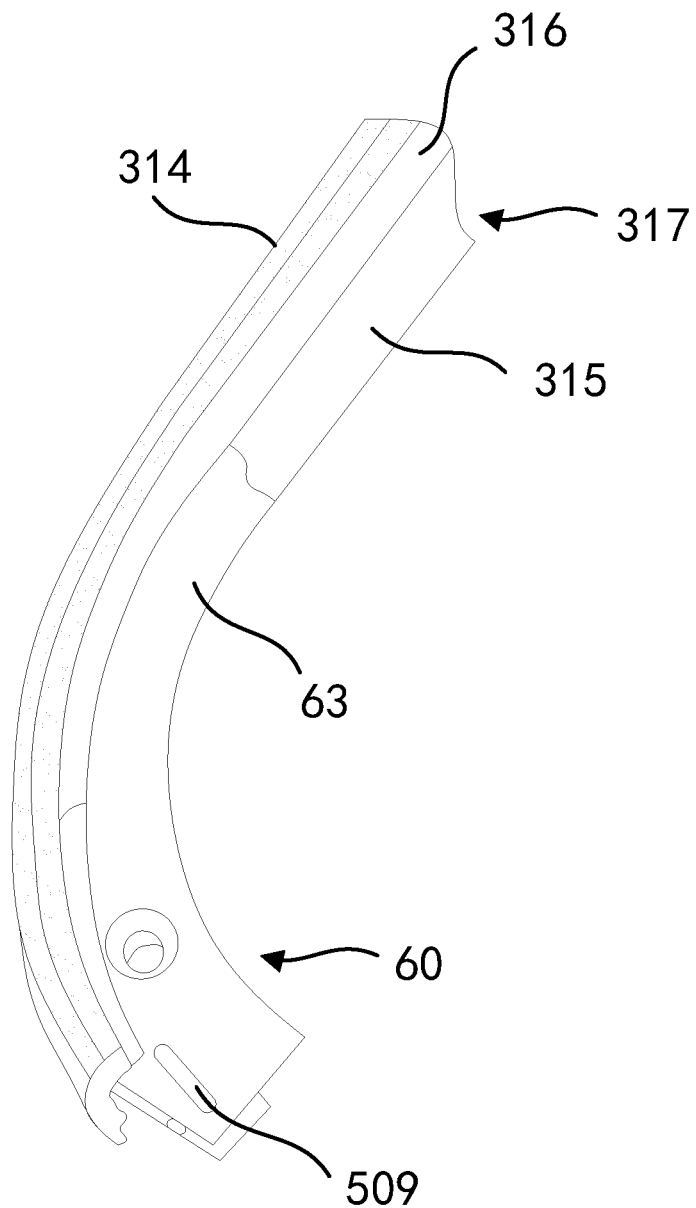
FIG. 9 is a schematic diagram of a three-dimensional structure of a cooperation between the middle frame and the switchover member in the display device provided in the embodiment of the present application.

In addition, FIG. 9 is a schematic diagram of a three-dimensional connection structure between the middle frame and the switchover member in the display device according to an embodiment of the present application. Referring to FIGS. 8 and 9, an end of the support portion 63 close to the second mounting portion 317 and an end of the second mounting portion 317 close to the support portion 63 may be overlapped mounted with each other, which makes the connection of the switchover member 60 and the middle frame 30 more reliable.

This is because, on the basis of fixing the positioning surface 62 of the switchover member 60 to the first mounting surface 313 of the first mounting section 312, the switchover member 60 is supported at another position of the switchover member 60, so that the second mounting section 314 may also contribute to the fixing of the switchover member 60.

It should be understood that, referring to FIG. 7, in order to make the second mounting portion 317 fix the switchover member 60 better, an end of the second mounting surface 315 may be located above an end of the support surface 61.

Referring to FIGS. 7 and 9, the second mounting surface 315 is provided with a boss 316 that extends to a front side of the support portion 63 and overlaps with a corresponding area of the support surface 61. The corresponding area here is, for example, a projection area generated by projecting the boss 316 onto the switchover member 60. An end of the boss 316 may overlap with the projection area of the switchover member 60.

When the panel 10 is fixed to the second mounting portion by adhesive glue, the boss 316 will prevent the glue from overflowing, or contributes to the positioning of adhesives. The boss 316 extends to the front side of the support portion and overlaps with the support portion, which can further improve the stability and reliability of the switchover member 60 and the middle frame 30.

A connection structure of the front housing 50, the switchover member 60 and the panel 10 is described below.

Figure 10:
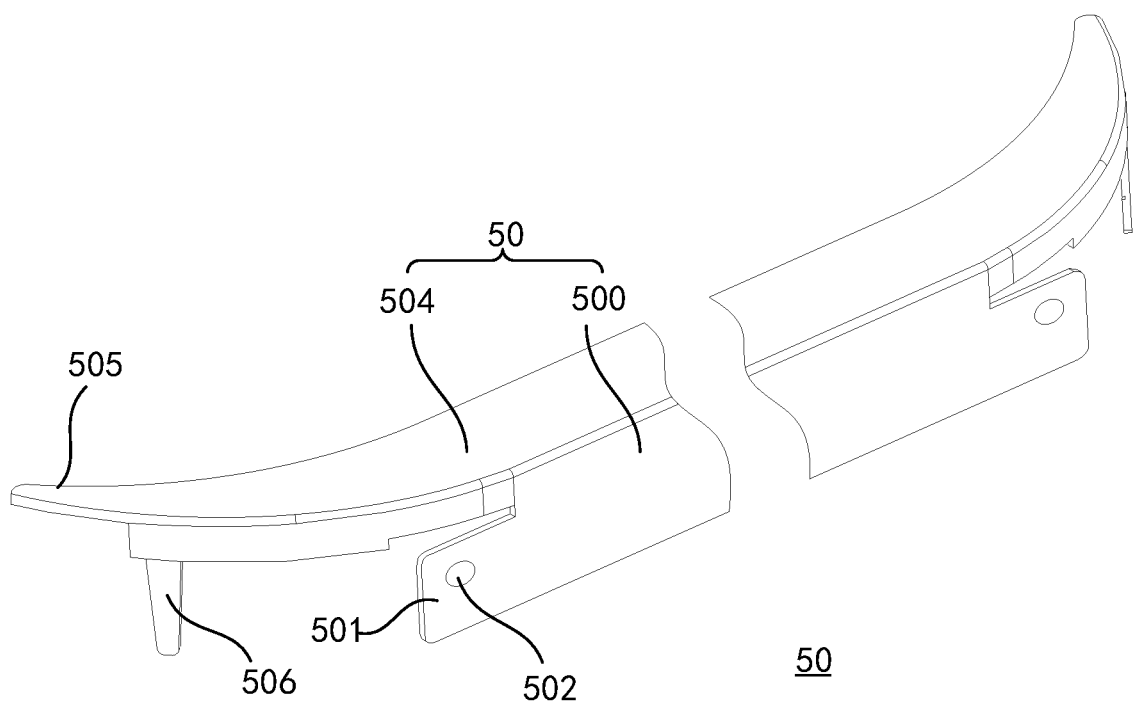
FIG. 10 is a schematic structural diagram of the front housing in the display device according to the embodiment of the present application.

FIG. 10 is schematic structural diagram of the front housing in the display device according to an embodiment of the present application. Referring to FIGS. 5, 6, and 10, the end 501 of the front housing 50 close to the side portion 31 is detachably connected to the switchover member 60.

For example, a hole 502 may be provided at the end 501 of the front housing for connection, an internal threaded hole 503 may be provided at a corresponding position of the switchover member 60, and the end 501 of the front housing may be aligned with the internal threaded hole 503, so as to connect them using a fastener such as a screw.

In addition, a circuit board such as COF 11 is connected to the bottom end of the panel 10.

Figure 11:
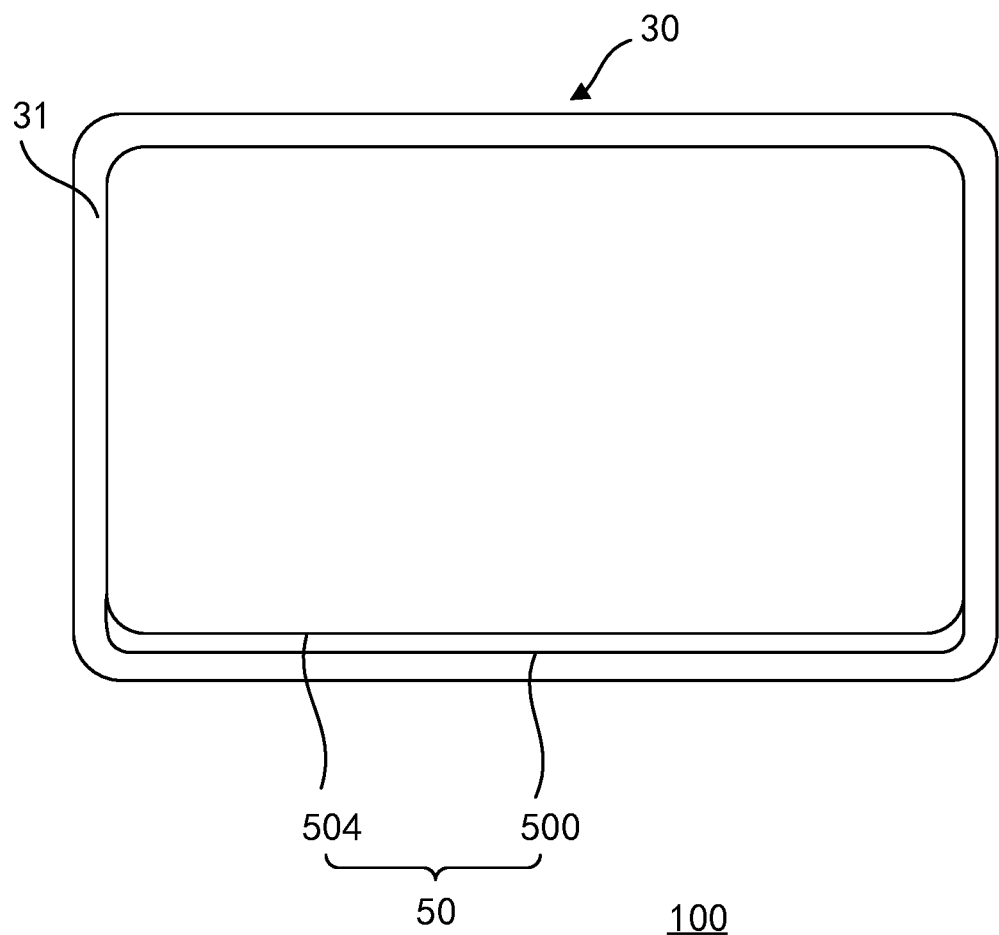
FIG. 11 is a top view of the display device according to the embodiment of the present application.

FIG. 11 is a top view of the display device according to an embodiment of the present application. Referring to FIGS. 4 and 11, the front housing 50 includes the following components.

A main body 500 locates outside a bottom end of the COF, and shields the panel 10 and the COF on a bottom side. A width of the main body 500 in an inner and outer direction is same as a width of the side portion 31 in the inner and outer direction, and further, the main body 500 and the side portion 31 may be made of the same material.

A shielding portion 504, extends inward to shield the bottom end of the panel 10 and the COF 11 on a front surface, and further, the shielding portion 504 and the main body 500 are made of different materials.

Since the width of the main body 500 in the inner and outer direction is same as the width of the side portion 31 in the inner and outer direction, the main body 500 and the side portion 31 are made of same material, and the shielding portion 504 and the main body 500 are made of different materials, it can make the middle frame 30 and the front housing 50 visually have a same width.

In addition, as described above, there is a gradually widened gap 85 between an inner side surface of the first mounting section 312 and the panel 10. Referring to FIG. 10, the shielding portion 504 is provided with an extension portion 505 which shields at a front side of the gap 85, so that the front housing 50 can shield the gradually widened gap 85. As shown in FIG. 9, in order to support the extension portion 505, a protruded support member 509 may also be provided at a front side surface of the switchover member 60.

In addition, referring to FIGS. 6 and 10, the extension portion 505 also has an insertion portion 506 extending backward, and a notch 64 is correspondingly provided on the switchover member 60, so that when the extension portion 505 extends above the switchover member 60, the insertion part 506 is inserted into the notch 64, which contributes to the positioning of the front housing 50.

Further, referring to FIG. 6, a threaded hole 65 may be provided on the switchover member 60, and the switchover member 60 may be fixed to the back plate 25 by a screw passing through the threaded hole.

Figure 12:
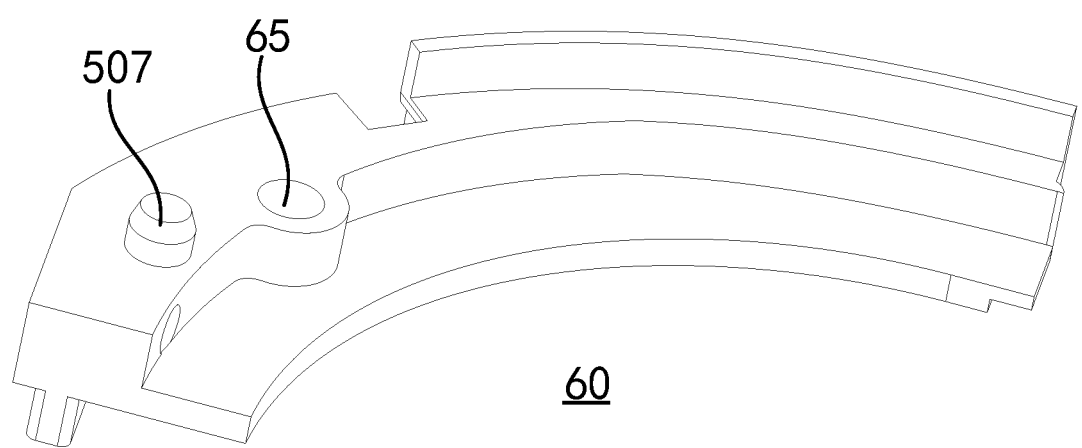
FIG. 12 is a schematic rear view of the switchover member in the display device according to the embodiment of the present application.

FIG. 12 is a schematic back view of the switchover member in the display device according to an embodiment of the present application. Referring to FIG. 12, it can be understood that, in order to make the connection of the switchover member 60 and the back plate 25 accurately, a post 507 is provided at a back surface of the switchover member 60 for positioning, and a hole is provided at a corresponding position of the back plate 25, so that when installing the connector, only the post 507 needs to be inserted into the hole, and then the back plate 25 and the switchover member 60 can be fixed through a fastener.

In the present embodiments, the display device 100 includes: a panel 10, the front of which is used to display an image; a backlight module 20, providing a backlight source for the panel 10 and including a middle frame 30, the middle frame 30 includes a side portion 31, and a side end of the panel 10 is fixed to the side portion 31; a front housing 50, covering a bottom side of the panel 10, there is a space between a bottom end of the front housing 50 and the bottom of the panel 10; and an switchover member 60, located in the space, and a corner of the display device 100 has a chamfer structure, and at a position corresponding to the chamfer structure, the switchover member 60 connects an end 311 of the side portion to an end 501 of the front housing. The end 311 of the side portion is connected to the end 501 of the front housing through the switchover member 60, in other words, the end of the front housing is connected to the end of the middle frame 30 through the switchover member 60, and the end of the middle frame 30 is directly connected to a back plate 25, which enables the end of the front housing to be indirectly fixed to the back plate 25, thus improving the connection strength at the corner position. Even if the display device 100 accidentally falls or goes through external force, the corner of the display device 100 won't be easily damaged, which improves the reliability of the display device 100.

Finally, it should be noted that the above embodiments are only used to illustrate the embodiments of the present application, but not intend to limit the embodiments; although the present application has been described in detail with reference to the aforementioned embodiments, a person skilled in the art should understand that: the aforementioned embodiments can be modified, or some or all of the technical features therein can be equivalently replaced; and these modifications or replacements do not deviate the essence of the corresponding embodiments from the scope of the appended claims of the present application.

What is claimed is:

1. A display device, comprising:
a panel, comprising a front surface configured to display an image, and a corner with a chamfer structure;
a backlight module, configured to provide a backlight source for the panel and comprising a middle frame having a side portion which is configured to fix to a side end of the panel;
a front housing, configured to cover a bottom side of the panel; and
a switchover member, located at a position corresponding to the chamfer structure and configured to connect an end of the side portion to an end of the front housing;
wherein the switchover member comprises a support surface extending along an inward direction, and the corner of the panel is fixed to the support surface;
wherein the inward direction is a direction from an edge of the panel toward a middle portion of the panel, and an outward direction is a direction from the middle portion of the panel toward the edge of the panel;
wherein the side portion comprises a first mounting section corresponding to the corner of the panel, the first mounting section comprises a first mounting surface disposed along a backward direction, and the switchover member is provided with a positioning surface facing along a forward direction corresponding to the first mounting surface, and the first mounting surface and the positioning surface are overlapped mounted;
wherein the backward direction is a direction from the front surface of the panel toward the back surface of the panel, and the forward direction is a direction from the back surface of the panel to the front surface of the panel;
wherein the side portion further comprises a second mounting portion connected to the first mounting portion, the second mounting portion comprises a second mounting surface extending inward, and at least a part of the side end of the panel is fixed to the second mounting surface;
wherein the support surface faces forward, and is higher than the positioning surface along the direction from front to back such that the second mounting surface and the support surface are located in the same plane.

2. The display device according to claim 1, wherein the second mounting section comprises a second mounting portion extending inward, and a front side surface of the second mounting portion is the second mounting surface.

3. The display device according to claim 2, wherein the switchover member comprises a support portion extending inward, and a front side of the support portion is the support surface.

4. The display device according to claim 3, wherein an end of the support portion close to the second mounting portion and an end of the second mounting portion close to the support portion are overlapped mounted with each other.

5. The display device according to claim 4, wherein the second mounting surface is provided with a boss that extends to a front side of the support portion and overlaps with a corresponding area of the support surface.

6. The display device according to claim 1, wherein a guide post is provided on the positioning surface, and a guide hole is correspondingly provided on the first mounting surface to mate with the guide post.

7. The display device according to claim 1, wherein a guide post is provided on the first mounting surface, and a guide hole is correspondingly provided on the positioning surface to mate with the guide post.

8. The display device according to claim 1, wherein the display device further comprises a back plate, located on a side opposite to the panel, a threaded hole is provided on the switchover member, and the switchover member is fixed to the back plate by a screw passing through the threaded hole.

9. The display device according to claim 1, wherein the display device further comprises a back plate, located on a side opposite to the panel, a post for positioning is provided at a back surface of the switchover member, and a positioning hole is provided at a corresponding position of the back plate.

10. The display device according to claim 1, wherein the display device further comprises a back plate, located on a side opposite to the panel, a positioning hole is provided at a back surface of the switchover member, and a post for positioning is provided at a corresponding position of the back plate.

11. The display device according to claim 1, wherein the end of the front housing close to the side portion is detachably connected to the switchover member.

12. The display device according to claim 6, wherein a circuit board is connected to a bottom end of the panel.

13. The display device according to claim 12, wherein the front housing comprises:
a main body, located outside a bottom end of the circuit board, and shielding the panel and the circuit board along the direction from front to back; wherein a width of the main body in an inner and outer direction is the same as a width of the side portion in the inner and outer direction.

14. The display device according to claim 13, wherein the front housing further comprises:
a shielding portion, extending inward to shield the bottom end of the panel and the circuit board from a front surface.

15. The display device according to claim 14, wherein a gap is between an inner side surface of the end of the side portion and the panel, and the shielding portion comprises an extension portion which shields at a front side of the gap.

16. The display device according to claim 14, wherein the main body is provided with a hole for connection, and an internal threaded hole is provided at a corresponding position of the switchover member to achieve a detachable connection.

* * * * *